(No Model.)
J. C. ATWATER.
DOOR KNOB AND SHANK.
No. 371,295.            Patented Oct. 11, 1887.
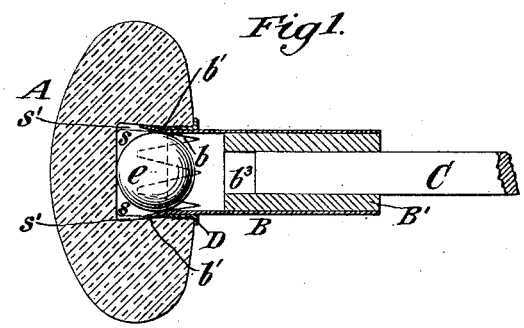
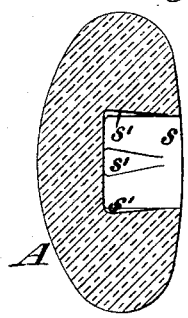   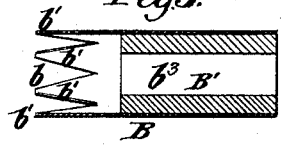
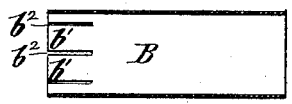
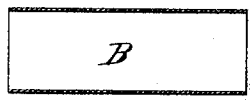
Witnesses.
Emil Kerten
C. L. Sundgren
Inventor:
John C. Atwater
By his Attys
Brown & Hall

UNITED STATES PATENT OFFICE.

JOHN C. ATWATER, OF NEW YORK, N. Y.

DOOR-KNOB AND SHANK.

SPECIFICATION forming part of Letters Patent No. 371,295, dated October 11, 1887.

Application filed April 25, 1887. Serial No. 235,984. (No model.)

*To all whom it may concern:*

Be it known that I, JOHN C. ATWATER, of the city and county of New York, in the State of New York, have invented a new and useful Improvement in Door-Knobs and Shanks, of which the following is a specification.

My invention relates to knobs and their shanks or bushings in which the inner end of the shank is divided and is expanded into a dovetailed or undercut hole in the knob by forcing it thereinto; and the invention consists in novel combinations of parts, hereinafter particularly described, and pointed out in the claims.

In the accompanying drawings, Figure 1 is a longitudinal section of a knob and its shank embodying my invention and a portion of the spindle entering the shank. Fig. 2 is a sectional view of the knob alone. Fig. 3 is a sectional view of a ferrule or bushing, which is inserted in the knob-recess, and beyond the inner end of which the fingers are expanded by the expander. Fig. 4 represents a sphere which constitutes a preferable form of expander. Fig. 5 is a longitudinal section of the tubular shank as made and ready for insertion into the knob, and Figs. 6 and 7 represent axial sections of tubular shanks of slightly modified forms.

Similar letters of reference designate corresponding parts in all the figures.

A designates the knob, which may be of porcelain or other material from which door-knobs are commonly made, and B designates a tubular shank which is to be secured thereinto, and which may consist of a thin brass tube having, normally, a substantially uniform diameter throughout. The end of this shank may be plain, as shown in Fig. 7, or it may be cut or divided longitudinally, as at $b$ in Fig. 5, so as to form a circular series of expanding fingers, $b'$.

In Fig. 5 I have represented the fingers $b'$ as formed by V-shaped notches $b$, extending inward from the end of the shank, and in Fig. 6 I have represented the expanding fingers $b'$ as formed by straight saw-cuts $b^2$ in the end of the tube. Either form may be employed.

The shank may be of thin brass, and in order to receive the spindle C, which is of polygonal form or square, I have represented a bushing, B', as secured in the tubular shank B by solder or otherwise, and having a polygonal hole, $b^3$, of a form corresponding to the transverse section of the spindle C and receiving the spindle within it.

In the knob A is a main recess, $s$, which is dovetailed or inwardly enlarged. Such inward enlargement may be made in the form of minor recesses $s'$, formed in the wall of the main recess and tapering from the bottom of the recess toward the inner side of the knob. These minor recesses $s'$ give the main recess $s$ a dovetailed or undercut form, or, in other words, serve to enlarge it inwardly from its mouth. I may employ in that recess a ferrule or bushing, D, which is represented in Fig. 3 as having a slight flange, $d$, and which may be inserted in the recess $s$, as shown in Fig. 1. The periphery of this ferrule or bushing may be roughened or grooved, as shown at $d'$, and it is of such size internally, if used, as to receive snugly and yet freely within it the cut or divided end of the tubular shank B. If the ferrule or bushing D is not used, the tubular shank B is of such size as to fit with corresponding snugness in the main recess $s$. When the ferrule or bushing D is placed in the main recess, which it fits tightly, the tubular shank B may be inserted into it or slid inward and outward through it without any material resistance until there is placed within the recess $s$ a central expander, which I have here represented as consisting of a sphere, $e$, and which in any case I prefer to form with a convex outer face.

When the parts of the device are to be assembled and secured together, the sphere or ball $e$, or other expander, is placed in the recess $s$, and the cut or divided end of the tubular shank B is inserted in the recess and forced with considerable and sufficient pressure over the sphere or expander $e$. This sphere or expander serves to spread the fingers $b'$ or expand them outward, as shown in Fig. 1, tightly against the wall of the recess $s$ at a point inside of the inner end of the ferrule or bushing D, and at the same time serves in a measure to expand said ferrule, if the latter be employed, and cause its roughened periphery $d'$ to be securely engaged with the wall of the recess $s$. This being done, no pulling force which can ever come upon the knob will be sufficient to pull it from the shank B. The tubular shank may be a piece of seamless tubing, it being only necessary that it be sufficiently thin to enable its fingers $b'$ to be spread or expanded, and it is advantageous to have the outer face of the expander convex, because then it more easily spreads the fingers $b'$ when the cut or divided end of the tubular shank is forced downward upon it and over it. The tubular shank B may then be secured firmly in the knob A by the expander $e$ without the necessity of passing the expander through said shank after the latter is inserted in the knob. In forcing the tubular shank inward on the expander $e$ some of the fingers $b'$ will without doubt be expanded into the minor tapering recesses $s'$, although the said fingers are not arranged in a circle with any particular relation to the recesses, and the expanding or spreading of the fingers into such minor recesses will increase the security of the hold of the tubular shank in the knob.

I am aware that a tubular shank has been made of uniform bore, save at the inner end, where its bore is tapered, and that an expander smaller than the uniform diameter of the bore has been forced inward through the shank to expand the inner end portion thereof into the knob recess. My shank B has a normally straight and uniform bore, as distinguished from one having its bore taper and smaller at the inner end, and my expander $e$ is larger than the bore of the shank and cannot be entered through the shank.

I am also aware that a shank has had sawcuts or slots in its inner end and in parallel planes, and that wedges inserted in these cuts or slots have been forced in by the driving of the shank into the knob-recess. Such a construction provides for expanding the shank in opposite directions or one plane only, while my device spreads the shank in all directions.

What I claim as my invention, and desire to secure by Letters Patent, is—

1. The combination, with a door-knob, A, having a dovetailed or inwardly-enlarged recess, of a tubular shank having a normally straight and uniform bore, and at one end snugly fitting said recess, and a central expander made separate from the knob, larger in diameter than the internal diameter of the shank, and which, when it is placed in the knob-recess and has the end of the shank forced inward over it, serves to expand said end in all directions against the wall of the recess, substantially as herein described.

2. The combination, with the koor-knob A, having the recess and the bushing D inserted therein, of the tubular shank B, having its end cut or divided and of substantially uniform diameter throughout, and the central expander, $e$, separate from the knob and larger than the bore of the shank, and by which the cut or divided end of the shank is expanded within the bushing D and in all directions when the shank is forced inward over the expander, substantially as herein described.

JOHN C. ATWATER.

Witnesses:
 FREDK. HAYNES,
 HENRY J. MCBRIDE.